United States Patent [19]
Barnes

[11] 3,827,173
[45] Aug. 6, 1974

[54] FISHING ROD HANDLE

[75] Inventor: Richard D. Barnes, Costa Mesa, Calif.

[73] Assignee: The Conolon Corporation, Santa Ana, Calif.

[22] Filed: Mar. 20, 1973

[21] Appl. No.: 343,161

[52] U.S. Cl. .................................................. 43/23
[51] Int. Cl. ............................................ A01k 87/00
[58] Field of Search .................................. 43/22, 23

[56] References Cited
UNITED STATES PATENTS

| | | | |
|---|---|---|---|
| 1,994,449 | 3/1935 | Burdick | 43/22 |
| 2,057,535 | 10/1936 | McKechnie, Jr. | 43/22 |
| 2,424,430 | 7/1947 | Beyer | 43/22 |
| 2,593,747 | 4/1952 | Godfrey | 43/23 X |

FOREIGN PATENTS OR APPLICATIONS

| | | | |
|---|---|---|---|
| 744,912 | 10/1966 | Canada | 43/22 |

*Primary Examiner*—James H. Czerwonky

[57] ABSTRACT

A fishing rod handle to which is attached a reel with a foot has a base with a forward lip to receive the front of the reel foot. The rear of the base contains a longitudinal threaded aperture through which a threaded forward projection of a hand grip is turned to extend over and secure the rear of the reel foot. A tubular shield attached to the base extends rearwardly over the front of the hand grip to cover any clearance between the front of the hand grip and the rear of the base.

7 Claims, 4 Drawing Figures

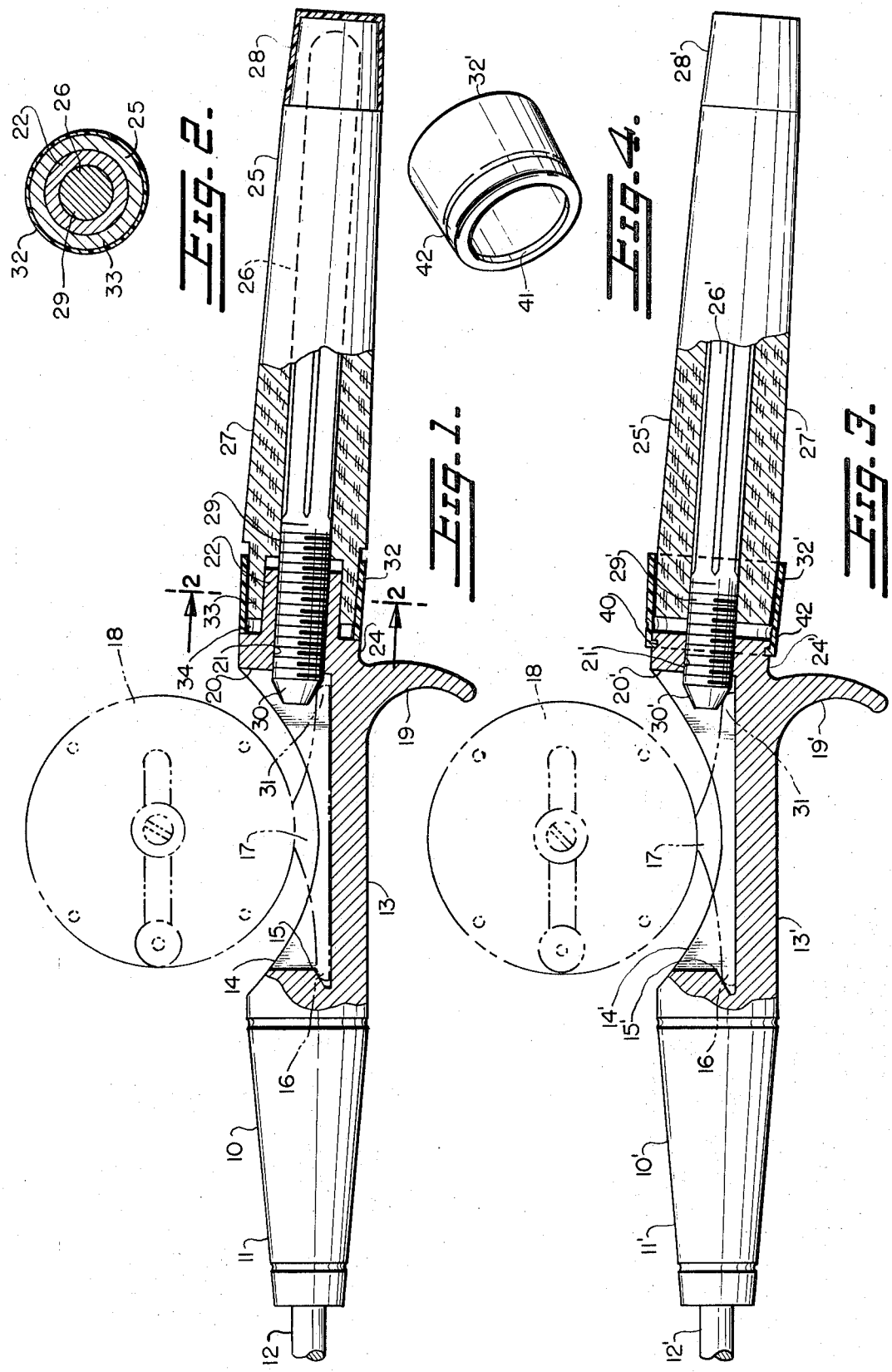

FISHING ROD HANDLE

BACKGROUND OF THE INVENTION

The foot of a reel is conventionally fixed in the base of a fishing rod handle by means of a forward lip which receives the front of the reel foot and a sliding member which requires a complex drive to urge it forward to extend over and secure the back of the foot of the reel. This conventional type of fishing rod handle is costly to make and is more complicated to use. The fishing rod handle of this invention is inexpensive rugged, and easy to use.

BRIEF DESCRIPTION OF THE DRAWING

FIG. 1 is a side view of a fishing rod handle according to a first embodiment of this invention with a central portion broken away in longitudinal, vertical section and with a reel shown in phantom lines attached thereto;

FIG. 2 is a transverse section taken in line 2—2 of FIG. 1;

FIG. 3 is a side view of a fishing rod handle according to a second embodiment of this invention with a central portion broken away in longitudinal, vertical section and with a reel shown in phantom lines attached thereto; and FIG. 4 is a perspective view of a hand grip shield according to a second embodiment of this invention.

DESCRIPTION OF THE PREFERRED EMBODIMENTS

As shown in FIGS. 1 and 2, a fishing rod handle 10 has a tapered front end 11 in which a rod 12 is fixed. Handle 10 has a base 13 with sides 14 and a front lip 15 under which the front 16 of foot 17 of reel 18 extends. Base 13 is extended to form a trigger rest 19. The rear of base 13 forms a vertical wall 20 having at least a cylindrical rear portion 24 containing a threaded aperture 21. A boss 22 may extend rearwardly about aperture 21.

Hand grip 25 has an inner body 26 about which there is force fitted grip 27 of cork or the like. Hand grip 25 terminates in a plastic butt cap 28. The front of inner body 26 is formed into a threaded member 29 which terminates in a rounded or conical front end 30. Member 29 is turned by rotating grip 25 to screw member 29 through aperture 21 and force the conical front end 30 over the rear 31 of reel foot 17 to lock the reel 18 in place. A tubular shield 32 extends about a forward projecting boss 33 of grip 27 to cover any clearance 34 between the end of boss 33 and wall 20. Boss 33 extends over boss 22.

A preferred embodiment of this invention is shown in FIGS. 3 and 4. A fishing rod handle 10' has a tapered front end 11' in which a rod 12' is fixed. Handle 10' has a base 13' with sides 14' and a front lip 15' under which the front 16 of foot 17 of reel 18 extends. Base 13' is extended to form a trigger rest 19'. The rear of base 13' forms a vertical wall 20' having at least a cylindrical rear portion 24' containing a threaded aperture 21'. An annular groove 40 is formed about rear wall 20'.

Hand grip 25' has an inner body 26' about which there is force fitted grip 27' of cork or the like. Hand grip 25' terminates in a plastic butt cap 28'. The front of inner body 26' is formed into a threaded member 29' which terminates in a conical front end 30'. Member 29' is turned by rotating grip 25' to screw member 29' through aperture 21' and force the conical front end 30' over the rear 31 of reel foot 17 to lock reel 18 in place. A tubular shield 32' has an inturned front edge 41 which snaps into annular groove 40. An annular crimp 42 may be rolled on the installed shield 32' to lock it in place.

The fishing rod handle 10 or 10' of this invention is less costly to manufacture, provides a sure attachment for a reel 18, is easy to use, and is more rugged in its construction.

I claim:

1. A fishing rod handle to which a reel with a foot having front and back ends is fixed, said fishing rod handle comprising, in combination, a front end securable to a rod, a base extending rearwardly from said front end, a lip at the front of said base under which the front end of a foot of a reel is securable, a vertical wall at the rear of said base terminating in a rearwardly disposed cylindrical portion, said vertical wall containing a centrally threaded aperture, an inner body having a threaded front end, a hand grip disposed about said inner body with the front end of said hand grip having a cylindrical configuration substantially the same as said cylindrical portion of said vertical wall, and a tubular shield longitudinally slidably mounted on the cylindrical front of said hand grip to shroud any clearance between the front of said hand grip and said rear wall, whereby rotation of said hand grip turns said threaded front end through said threaded aperture to extend over and secure the rear end of said reel foot.

2. The combination according to claim 1 wherein said threaded front end of said inner body terminates in a conical portion which engages said rear end of said reel foot.

3. The combination according to claim 1 wherein said cylindrical portion of said vertical wall contains an annular groove and with the addition of a tubular shield having an inturned front edge seated within said annular groove securing said shield to said vertical wall with said hand grip extending within said shield.

4. The combination according to claim 1 wherein said rearwardly extending base has sides extending upwardly therefrom to receive therebetween a reel foot resting on said base.

5. A combination according to claim 4 wherein said threaded front end of said inner body terminates in a conical portion which engages said rear end of said reel foot.

6. The combination according to claim 4 wherein said threaded front end of said inner body terminates in a conical portion which engages said rear end of said reel foot.

7. The combination according to claim 4 wherein said cylindrical portion of said vertical wall contains an annular groove and with the addition of a tubular shield having an inturned front edge seated within said annular groove securing said shield to said vertical wall with said hand grip extending within said shield.

* * * * *